June 12, 1951 C. E. HANSEN 2,556,535
FINGER GUIDE FOR CLARINETS
Filed Aug. 18, 1949

Curtis E. Hansen
INVENTOR.

BY Thomas A. O'Brien
and Harvey B. Jacobson
Attorneys

Patented June 12, 1951

2,556,535

UNITED STATES PATENT OFFICE 2,556,535

FINGER GUIDE FOR CLARINETS

Curtis E. Hansen, Luck, Wis., assignor of fifty per cent to Marvin L. Nyman, Luck, Wis.

Application August 18, 1949, Serial No. 110,965

2 Claims. (Cl. 84—382)

The present invention relates to ways and means whereby players of clarinets may be trained to utilize their fingers to the utmost of advantage in acquiring and ultimately maintaining great fingering skill and consequently, establishing a dextrous fingering technique.

Although my invention was devised and seems best for training beginners and students, it will, I submit, also serve to correct fingering faults of those who, as finished performers, are willing to re-educate their fingers in an effort to bring about fingering speed and a resultfully better performance.

Those familiar with clarinets are aware that soprano, alto and bass clarinets are the most prominent instruments, in fact, the most required instruments, in a band. A band of say 72 pieces would be made up of twenty to forty per cent of clarinets. Therefore, the clarinet is to the band what the violin is to the orchestra. In such circumstances, inventors are constantly and slavishly engaged in improving any conceivable part or mechanism of the clarinet and although innovations and "contraptions" are not sanctioned, there is great activity, at all times, to assist the ever-important clarinetist.

It has been my experience that it would be practical to utilize an accessory or attachment of the clarinet barrel in restraining and training the lifting movements of the fingers on the main bank of tone holes and rings. Obviously, beginners confronted with difficulties conquering mechanical mechanisms, coping with mouthpieces and reeds, sight reading of musical composition and so on, are apt to attach little significance to the fact that acquiring the bad habit of raising the fingers too high off the principal tone holes will ultimately become a drawback to good fingering technique. In the circumstances, I have devised and find practical a simple device, which is attachable to the barrel in alignment with same and over the main tone holes, whereby, through its use, students and even seasoned players, will find it to be not only a practical gauge but a great utility in mastering good fingering habits.

Other objects and advantages will become more readily apparent from the following description and the accompanying illustrative drawings.

In the accompanying sheet of drawings, wherein like numerals are employed to designate like parts throughout the views.

Figure 1:
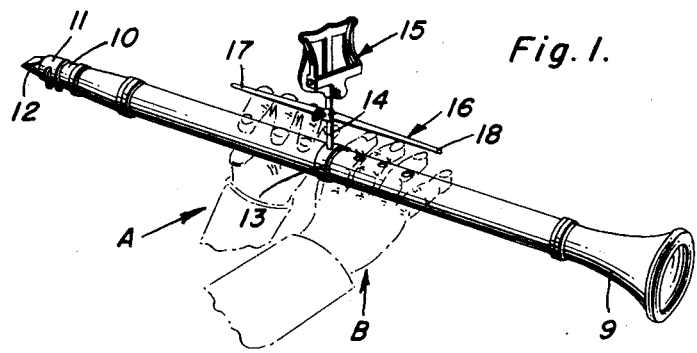
Figure 1 is a perspective view of a skeletonized clarinet with my improved finger training guide in use thereon.
Figure 2:
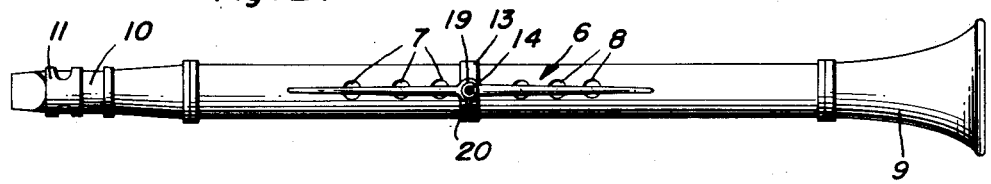
Figure 2 is a top plan view with the clamp of the music lyre removed.
Figure 3:
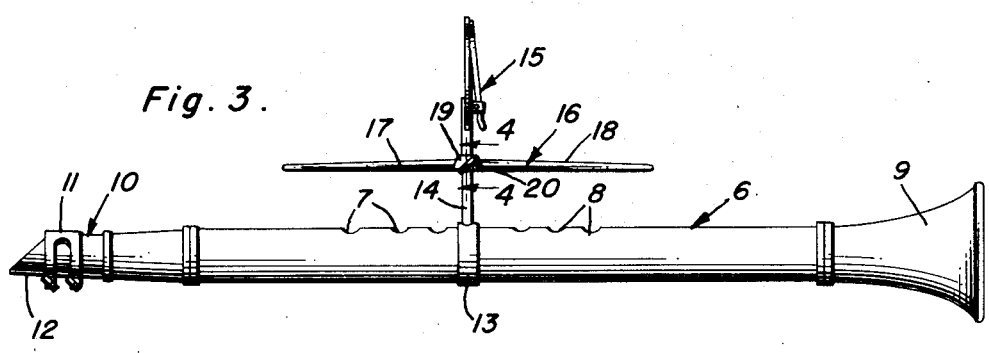
Figure 3 is a side elevation of the structure seen in Figure 1.
Figure 4:
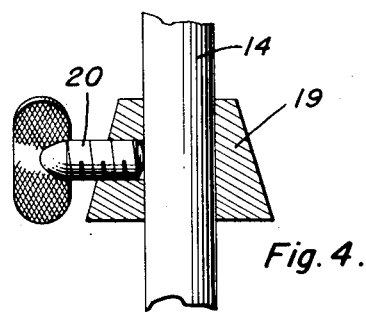
Figure 4 is an exaggerated sectional and elevational view taken on the vertical line 4—4 of Figure 3, looking in the direction of the arrows.

Referring now to the drawings by distinguishing reference numerals and lead lines, the clarinet, as a complete instrumentality, is denoted by the numeral 6 and embodies customary detachably connectible sections forming the bell-equipped barrel. The main key bank portion of the barrel is provided with tone holes 7 and 8 for the fingers of the left and right hands 9 and 10, respectively. I have left off the keys, finger controls and other elements which go to make up the valving mechanism, thus to simplify the understanding of my unique attachment. For completeness, I have shown the bell 9, mouthpiece 10, ligature 11, and reed 12. I have also shown a so-called music racking lyre which embodies a barrel encircling and attaching band or the like 13 having a standard 14 terminating in a music sheet clamping device 15. There are various types of lyres and ways and means whereby same are applied to clarinets, obviously. For sake of illustrative principle, the one shown will do. By this I mean that I prefer to mount my finger training and guiding attachment on the usual lyre with which clarinets are customarily provided. On the other hand, I desire to be understood that it is within the purview of this invention to provide a special adapter whereby same may be satisfactorily applied and used. The attachment per se is characterized by a simple linearly straight rod denoted by the numeral 16 and of appropriate materials and strength. It is of a length to occupy a position in parallelism to the barrel and to overlie, in spaced relationship, the main tone holes 7 and 8. By training the fingers of the hands in this central or main position, the performer becomes finger conscious and, by studious restraint and effort, finally learns how to overcome the fault of lifting the fingers too high; conserving lost motion, and finally acquiring a fast moving finger technique. The bar or rod 16 may be said to be made up of complemental tapered end portions 17 and 18 jointed to a collar 19 which is slidably mounted on the standard 14 and held in various adjustable positions by a set screw 20, the latter carried by the collar and engageable with the standard. It follows that the invention is a simple, straight rod or equivalent stop which is disposed adjustably in spaced parallelism to the clarinet barrel and which is regulated as to desired or preferred position, whereby to function as a restraining and training finger guide, as is evident from Figure 1 of my drawings.

Novelty is predicated upon a finger training guide in combination with a clarinet, in combination with a lyre supported on a clarinet, in combination with a lyre detached from a clarinet, or an equivalent support to take the place of the lyre. Also, novelty is thought to be present in the device per se, that is, detached from the clarinet or lyre, as the case may be.

It is also, I believe, within the purview of this invention to consider same as applicable to other instruments than clarinets, for example, to saxophones, especially straight soprano saxophones and perhaps even to flutes.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. In a structural assemblage of the class shown and described, in combination, a clarinet barrel having the usual longitudinally spaced and aligned tone holes which are adapted to be covered by a player's fingers, a longitudinally disposed finger lift gauge, stop and training bar member, said member being in parallelism with the barrel and of a length that its opposite ends extend beyond the uppermost and lowermost tone holes, and means for slidably and rotatably mounting the intermediate portion of said bar on said barrel, whereby the opposite ends of the bar member are not only spaced from but completely free of connection with the barrel in order that the fingers may be allowed to reach beyond the corresponding ends of the bar for purposes of unobstructedly opening and closing various side keys which are out of alignment with the stated tone holes.

2. As a new article of manufacture, a clarinet attachment which in use is adapted to assist in training one's fingers to bring about fingering skill and dextrous technique comprising a bar member of a length to extend at opposite ends beyond the positions of the usual tone holes representing the main bank of tones obtainable in a clarinet barrel, said bar member being provided midway of its opposite ends with a collar provided with a set screw, the collar being adapted to be slidably and rotatably mounted on the usual vertical shaft portion of a conventional type clarinet lyre.

CURTIS E. HANSEN.

REFERENCES CITED

The following references are of record in the file of this patent:

UNITED STATES PATENTS

| Number | Name | Date |
|---|---|---|
| 389,346 | Utzinger | Sept. 11, 1888 |